March 7, 1967 G. O. CROWTHER ETAL 3,308,280
ADDING AND MULTIPLYING COMPUTER
Filed Nov. 12, 1964 5 Sheets-Sheet 1

INVENTOR.
GERALD O. CROWTHER
GEORGE C. DELI
BY
AGENT

United States Patent Office 3,308,280
Patented Mar. 7, 1967

3,308,280
ADDING AND MULTIPLYING COMPUTER
Gerald Offley Crowther, Cheam, and George Charles Deli, Carshalton, England, assignors to North American Philips Company, Inc., New York, N.Y., a corporation of Delaware
Filed Nov. 12, 1964, Ser. No. 410,582
Claims priority, application Great Britain, Nov. 12, 1963, 44,646/63
4 Claims. (Cl. 235—160)

This invention relates to a computing machine having means for performing addition and multiplication processes and the present invention is directed towards an arrangement for performing these addition and multiplication processes. According to one aspect of the present invention a computing machine comprises an electronic input store for storing a first number with decimal point information, and a keyboard for inserting the first number into the input store. The invention includes an electronic accumulator store for cumulatively receiving information derived from the input store, means for adding into the accumulator store a first number stored in the input store and for so performing said addition that the position of the decimal point of the first number can be automatically compared with the position of the decimal point of a second number already in the accumulator store, whereby to add the two numbers with correct reference to the decimal point of each example.

Suitably, the multiplying facility in such a machine is provided by multiplying means operable to multiply a first number in the input store by a second number fed into the machine at the keyboard and operable to transfer to the accumulator store, by separate addition stops, the individual products of the whole of the first number and each digit of the second number, together with means for automatically moving the position of the decimal point in the accumulator store during such addition steps so as to prevent loss of significant figures of the product number finally stored in the accumulator store.

One embodiment of the invention will now be described with reference to the accompanying diagrammatic drawings wherein.

Figure 1:
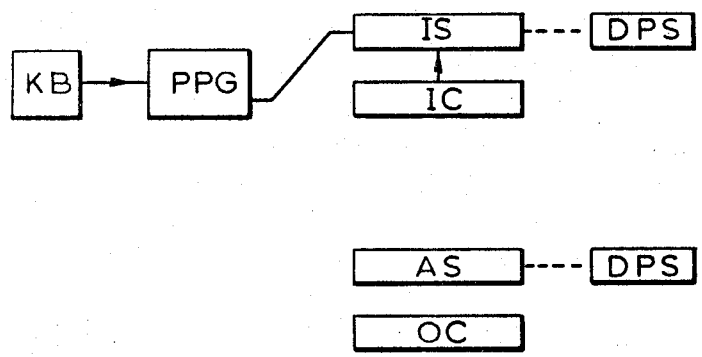
FIGURES 1 and 2 are block diagrams of a computing machine.

Referring to FIGURE 1, this illustrates in block diagammatic form a computing machine comprising a keyboard KB, a pulse pattern generator PPG, an input store IS controlled by an input control IC and having associated with it a decimal point store DPS, and an accumulator store having similarly associated with it a decimal point store DPS, and an output control OC. In the initial condition of the machine the input and accumulator stores are all empty, that is to say they all register a chain of zeros. The first step, irrespective of the actual operation required, is to feed information to the input store and this is effected, as illustrated in FIGURE 1, by causing the keyboard to control the pulse pattern generator PPG and cause PPG to feed pulse trains into the input store IS under the control of the input control IC. The keyboard is provided with a single set of ten keys labelled "1," "2," etc. to "0" and also has "ADDS," "MULTIPLY" and "DECIMAL POINT" keys.

Figure 2:
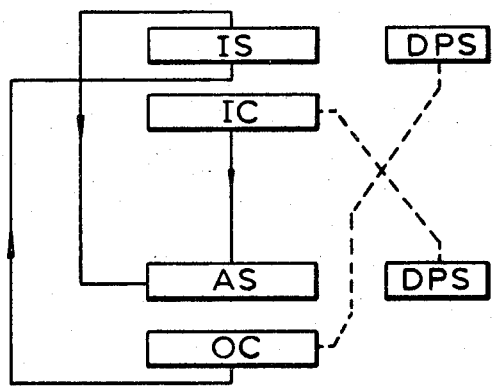

The information is now in input store IS, and in order to free the input store so that it can receive further information it is necessary to transfer the information in the input store IS to the accumulator store AS. The arrangement for transferring this information from IS to AS is illustrated by the block diagram of FIGURE 2 and the necessary alteration in the connections between the various blocks are effected by pressing the ADD key, which causes the information in the input store to be transferred to the accumulator store. When the ADD key is pressed the input control is disconnected from the input store and connected to the accumulator store, the output control is connected to the input store and as will be seen from FIGURE 2 there is now established a path from the input store to the accumulator store so that information in the input store can be passed to the accumulator store under the control of the output control. Now, it is necessary when transferring information from the input to the accumulator stores to have regard to the relative positions of the decimal points of the two numbers: of course, although as is stated above, we have assumed that the accumulator store is initially set to zero, this would not necessarily be the case when we are performing later steps in an addition process. The effect of the two decimal point stores, one in the input store and one in the accumulator store, is to "line up" the two numbers in the two stores so as to ensure that the two numbers are added with correct reference to their respective decimal points. The details of this control of the decimal points will be described later.

We thus have arrive at a situation where a first number has been inserted into the input store and has been transferred to the accumulator store leaving the input store once more empty. A further number can now be put into the input store by means of the keyboard. If the ADD key is again pressed then this second number will be added to the number already in the accumulator store and will be erased from the input store.

It is of course possible to modify the above process by arranging that the number in the input store is added into the accumulator store but is not erased from the input store: repeated operation of the ADD key will then of course be equivalent to a multiplication, by repeated addition, of the number in the input store and its addition to any number already stored in the accumulator store.

During these addition processes the position of the decimal point in the accumulator store remains fixed.

As an example, conside the addition to a number already in the accumulator store of a second number in the input store: for example, let us add 1686.3 to 44.1. For convenience, it will be assumed that the machine has sufficient capacity for six columns of figures.

The initial condition is set out below and the various steps performed by the machine as a result of pressing the ADD key are each shown in sequence.

| | |
|---|---|
| Initial condition | 1686.30 AS<br>44.1000 IS |
| The ADD key is now pressed. | |

STEP 1

| | |
|---|---|
| The two decimal points are aligned and the "units" digits, that is to say, "6" in AS and "4" in IS, are added, giving | *<br>1690.30 AS<br>40.1000 IS<br>* |

STEP 2

| | |
|---|---|
| The next two digits following the decimal point are now added, giving | *<br>1690.40 AS<br>40.0000 IS<br>* |

STEP 3

| | |
|---|---|
| The next two digits are now added, giving | *<br>1690.40 AS<br>40.0000 IS<br>* |

STEP 4 AND STEP 5

| | |
|---|---|
| As we have now reached the end of the significant figures in the accumulator store the next two digits in the input store are scanned but are not added into the accumulator store. | |

STEP 6

| | |
|---|---|
| The third column of the accumulator store and the first column of the input store are added, giving | *<br>1730.40 AS<br>000000 IS<br>* |

The operation is now complete since the next column in order is the "units" column, which was our starting point; the sum is now in the accumulator store while the input store is empty. At each of the above steps the position in each store at which the digits are added has been indicated by asterisks: the provision of an arrangement whereby a digit from one column of the input store can be added to a digit in a different column of the accumulator store is considered in more detail hereinafter.

Having considered the process of addition it is now convenient to pass to the process of multiplication which can be regarded as repeated addition. Here there are two aspects to be considered. The first is the need to maintain what conveniently may again be termed the decimal point relationship of the numbers in the addition step. The second is the need to preserve the most significant figures of the product, that is to say if the product has more digits than the store can accommodate then it is the lowest order digit or digits that must be lost.

An example of the multiplication process will now be given.

*Example*

| | | |
|---|---|---|
| Multiply 686.3 by 121.2; assume that initially all stores are empty, so that we have the initial condition | 000000 AS<br>000000 IS | |

| Operation | | |
|---|---|---|
| 1 | Insert 686.3 into IS | 000000 AS<br>686.300 IS |
| 2 | Press MULTIPLY key: This causes the interconnections within the machine to transfer from the arrangement of Figure 1 to that of Figure 2, and throughout the subsequent steps the number in the input store remains the same. | |
| 3 | Press key "1": This adds, once, the number in the IS to the AS, giving | 686.300 AS |
| 4 | Press key "2": This shifts the decimal point in the AS one position to the right, giving | 6863.00 AS |
| | Adds in the number in the IS, with correct alignment of decimal points giving | 7549.30 AS |
| | And adds in the number in the IS a second time giving | 8235.60 AS |
| 5 | Press key "1": This shifts the decimal point in the AS one position to the right giving | 82356.0 AS |
| | And adds in once the number in the IS giving | 83042.3 AS |
| 6 | Press key DP: This fixes the decimal point for the rest of the process | 83042.3 AS |
| 7 | Press key "2": This adds, twice, the number in the IS; the decimal point in the IS is aligned one position to the right of the decimal point in the AS | 83179.5 AS |

It will be noted that although the correct answer to the problem is 83179.56, the final digit has been lost, as the machine can only deal with six-digit numbers.

It will be noticed that at each operation of a number key, after the first, the decimal point in the accumulator store AS is moved one position to the right and the number in the input store IS is added in to the accumulator store with what at first sight appears to be a "shift" of the number in the input store to the right. In fact, no such "shift" takes place but is simulated by providing the facility of transferring information from any position in the accumulator store, as will be explained later.

Figure 3:
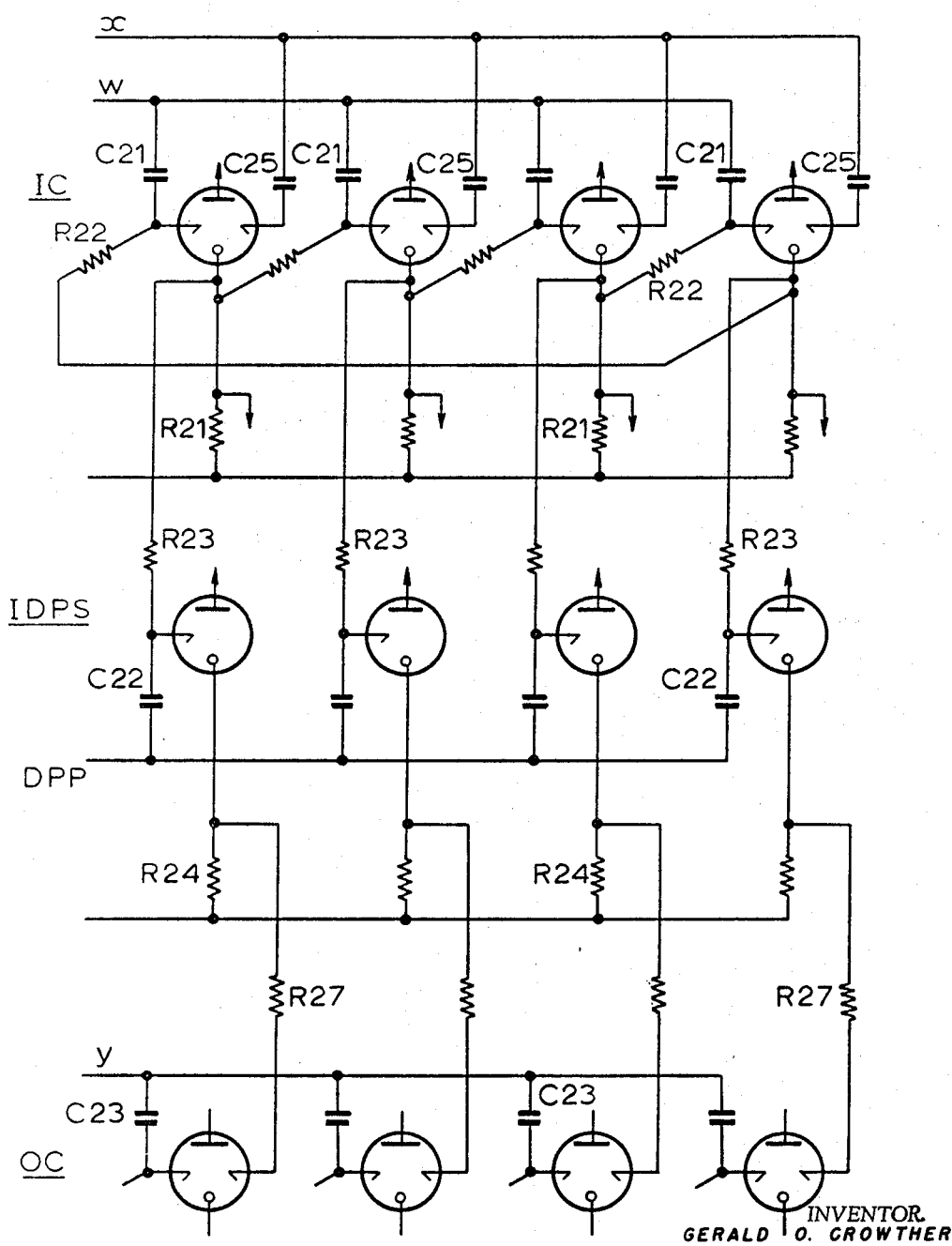
FIG. 3 is a schematic diagram showing a portion of the input control, input decimal, and output control tubes.

Certain of the circuits necessary to perform the functions which have been described above will now be discussed. Referring to FIGURE 3 this shows a chain of Input Control trigger-tubes a chain of Input Decimal Point Store tubes, also in the form of trigger-tubes, and part of a chain of Output Control trigger-tubes.

Each Input Control tube is of the two-trigger type and for the present only one trigger will be discussed. When a key of the keyboard is pressed a train of pulses appropriate to the depressed key is supplied by the pulse pattern generator PPG to the counting tubes which form the Input Store. At the end of this pulse train the pulse pattern generator applies along line $w$ a pulse to all the triggers of the tubes in this control. As can be seen from the figure these tubes are arranged as a ring counter and the application of a positive-going pulse to the common line causes the discharge to step along one position to the right. Thus for instance if the first tube on the left, as seen in FIGURE 3, is ignited and a number key is pressed, a pulse applied along line $w$ at the end of the pulse train will cause the first tube to extinguish and the second tube in the chain to ignite.

The cathode of each tube in the IC chain is connected through a resistor R23 to the trigger of a corresponding tube in the Input Decimal Point Store IDPS. These connections serve to apply to the appropriate tube in the IDPS chain a direct-voltage bias which is not of itself sufficient to cause the Decimal Point tube to ignite. If however the Decimal Point key is pressed then a positive-going pulse is applied along line DPP to the triggers of all tubes in the IDPS and the tube that is pre-biased by a tube in the IC chain will then ignite. This ignited tube will remain, in that condition irrespective of the further operation of number keys and will serve to "mark" the position of the Decimal Point in a number which is being fed into the input store under the control of the input control IC.

The cathode of each tube in the IDPS is returned to a common line of suitable negative potential through a resistor R24 and is also connected through a resistor R27 to a trigger electrode of a double-trigger tube in the Output Control OC. This chain of tubes OC is exactly similar to the chain IC and the other trigger electrode of each tube is connected through a respective capacitor C23 to a pulse line $y$. The cathode of each tube is connected through a resistor R28, shown in FIGURE 4, to a suitable negative line each of these triggers is connected through a capacitor C24 to a pulse line in the same manner as are the triggers of the tubes in the IDPS. The cathode of each tube in the ADPS is returned through a resistor R30 to a negative line and is also connected through a resistor R31 to the second trigger of the associated tube in the Input Control IC.

It will thus be seen that the two controls IC and OC and the two Decimal Points Stores IDPS and ADPS are connected so as to form what may be regarded as a loop. By this means the necessary "switching" of the connections illustrated in FIGURES 1 and 2 can be effected by applying suitable pulse or bias voltages at suitable points in the loop.

Figure 5:
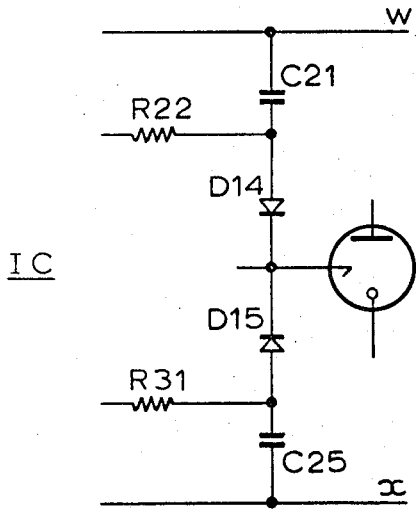
FIG. 5 is a schematic diagram illustrating a modification of the invention employing single trigger tubes.

In the above description the tubes in the two controls IC and OC have been assumed to be of the double-trigger type: however it is a simple matter to modify the circuit so as to use single-trigger tubes in these controls and such a modification is illustrated in FIGURE 5. Here, pulse lines w and x are applied through capacitors C21 and C25 and diodes D14 and D15 to the trigger of the tube in the control IC or OC. By means of positive bias voltages applied through R22 or R31 the effect of a positive-going trigger pulse on either line can be either inhibited or can be passed through to the trigger electrode of the tube so as to cause the tube to ignite in the condition when both a pulse and a bias are applied to it.

Figure 6:
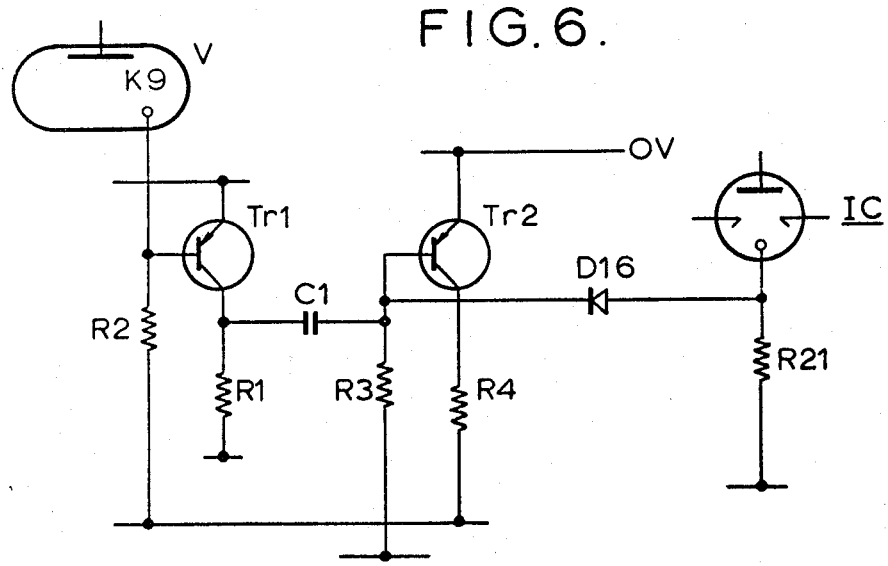
FIG. 6 is a schematic diagram showing the detail of an interstage gating circuit.

FIGURE 6 illustrates how the various units described can be associated with the circuits described in co-pending U.S. applications 331,676, 331,677 and 331,678; for convenience it is suitable to refer during the following part of the description to FIGURE 3 of the drawings accompanying U.S. application No. 331,677. FIGURE 6 illustrates a counting tube V and transistors Tr1 and Tr2 which form part of the inter-stage gate associated with the tube V. A description of the operation of this gate will be found in U.S. application 331,677. A connection from the cathode of the corresponding tube in the Input Control IC extends through a diode D16 to the base of transistor Tr2 in this gate circuit. This facility enables the gate to be controlled by the condition of the Input Control and therefore, as will be appreciated by referring to U.S. application 331,677 causes the Input Control to control the operation of the tubes in the counting chain associated with that gate. This arrangement enables the Input Control tube to control the stepping of the corresponding tube in the storage chain and, by inhibiting all stages in the chain except one, the stage which is not inhibited can be made either to "read-in," that is to say a digit can be added at that particular stage in the chain, or the counting tube of that particular stage can be caused to step around and to provide a chain of "read-out" pulses.

Figure 7:
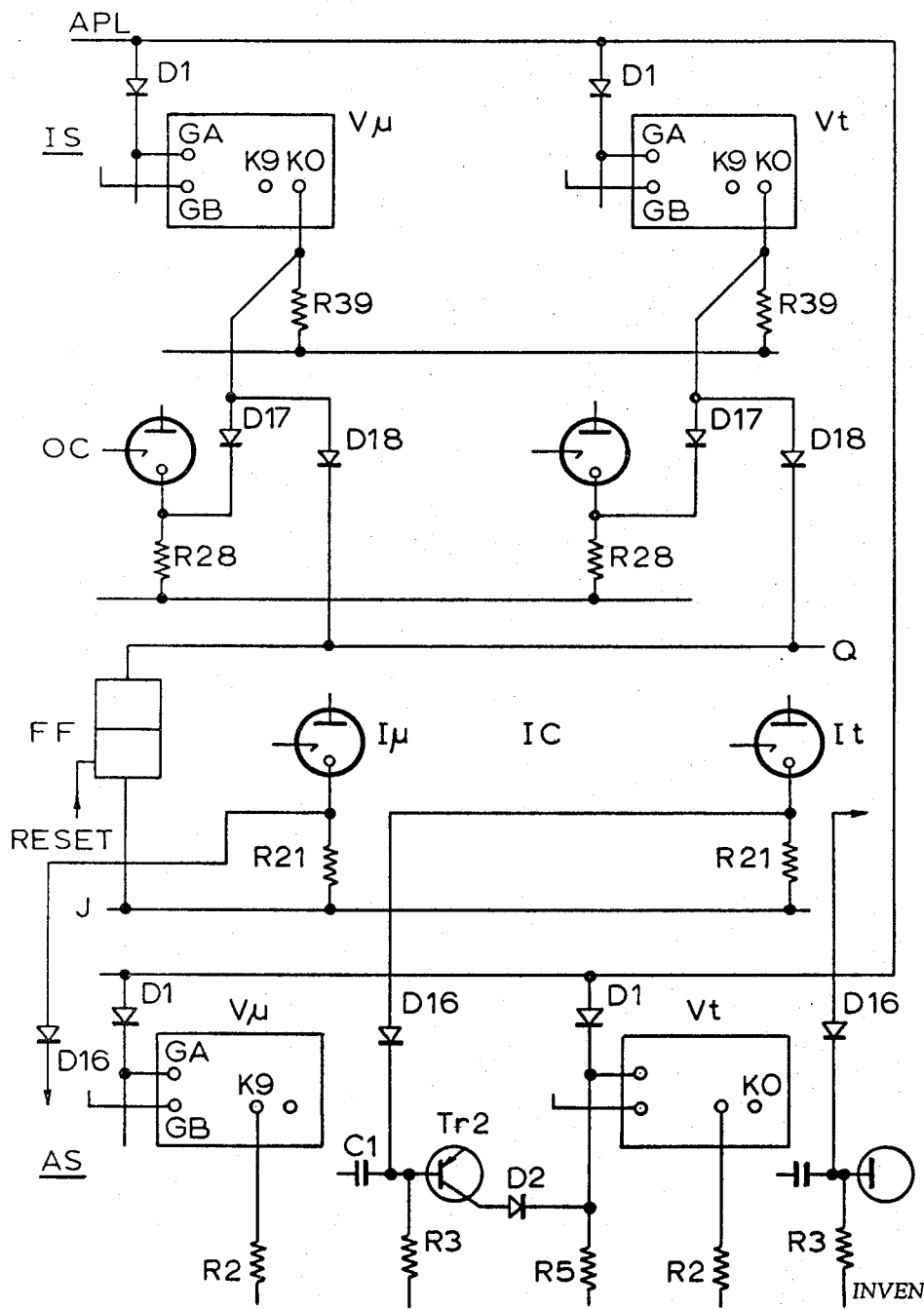
FIG. 7 is a schematic diagram illustrating one form of interconnection between the input and accumulator stores.

FIGURE 7 illustrates how the Input and Accumulator Stores can be inter-connected when it is desired to add information in the former into the latter. In this figure only the essentials of the interconnecting circuits are shown: details of the auxiliary circuit elements associated with any particular stage have been described above or have been described earlier in the above-mentioned specifications. A common "A" pulse line APL is connected to the "A" guides of the two chains of stepping-tubes through individual rectifiers D1 the operation of which has been described in the above-mentioned specifications. The "B" guides GB of all the tubes are connected to a common pulse line.

Considering first of all the Input Store IS, the "zero" cathode K0 of each stage is returned to a suitable negative line through a resistor R39 and is also connected to the cathode of the associated tube in the Output Control through a rectifier D17 and to a common line Q through a further rectifier D18. The common line Q is connected to the input of a bi-stable flip-flop FF and an output is taken from FF to the cathode return line of the tubes in the Input Control IC. As already described with reference to FIGURE 6 the cathode of each tube in the Input Control is taken through a rectifier D16 to the base of Tr2 in the appropriate inter-stage gate circuit of the Accumulator Store AS or of the Input Store IS as the case may be.

As an example of the manner in which this circuit operates, let us consider the operation of adding in a digit from the Input Store into the Accumulator Store while at the same time retaining the number in the Input Store for further addition—such for instance as would occur during multiplication—if required. Further, let us assume that this number is stored in the second tube Vt of the Input Store and is to be transferred into the corresponding tube Vt of the Accumulator Store. Let a series of ten pulses be applied to the line APL, the inter-stage gate circuits of the Input Store in the "read-out" condition. When the discharge on Vt in the Input Store reaches cathode K0 then assuming that the "tens" tube It of the output control OC is ignited, the positive voltage appearing at the cathode of this trigger-tube will be passed through D18 to line Q and will be sufficient to operate the flip-flop FF. This causes FF to apply a positive bias for the period of the remainder of ten pulses, to line J to which all the tubes of the Input Control IC are returned through their respective resistors R21. Now, as we are only reading out from the "tens" stage Vt in the Input Store, than in the Input Control only the trigger tube It is ignited and the positive voltage appearing at its cathode when combined with the positive bias applied along line J from the flip-flop FF will be sufficient when applied through rectifier D16 to raise the base of Tr2 to such a voltage that this transistor ceases to conduct. As described in the above-mentioned specification, this will open the gate controlling the "A" pulse input to the tube Vt in the Accumulator Store and the remainder of the pulses in the train will then operate tube Vt in the Accumulator Store and cause it to step. Thus for instance if Vt in the Input Store is on position "seven," and ten pulses are applied along line APL then when the discharge arrives at K0 the circuit FF will be operated and each pulse remaining in the chain of ten pulses on line APL will operate tube Vt in the Accumulator Store. This means that the third pulse in the train of ten applied along line APL will cause a discharge to arrive at K0 in the Input Store and the flip-flop FF will be operated; the remaining seven pulses wil then be added into the appropriate stage of the Accumulator Store and at the end of the train of ten pulses the tube in the Input Store is in the same condition as it was before "read-out" took place. At the end of the train the flip-flop FF is reset.

The above description is concerned with the process of addition of a single digit but as the process of multiplication merely consists of repeated addition then the operation can be seen to be substantially similar. Where however multiplication is required then issued of a single train of ten pulses being applied along line APL there will be applied a number of tens corresponding to the digit by which we wish to multiply the digit stored in the Input Store. At each pulse train of ten pulses the number in the Input Store will be added into the Accumulator Store by the process as already described.

Figure 4:
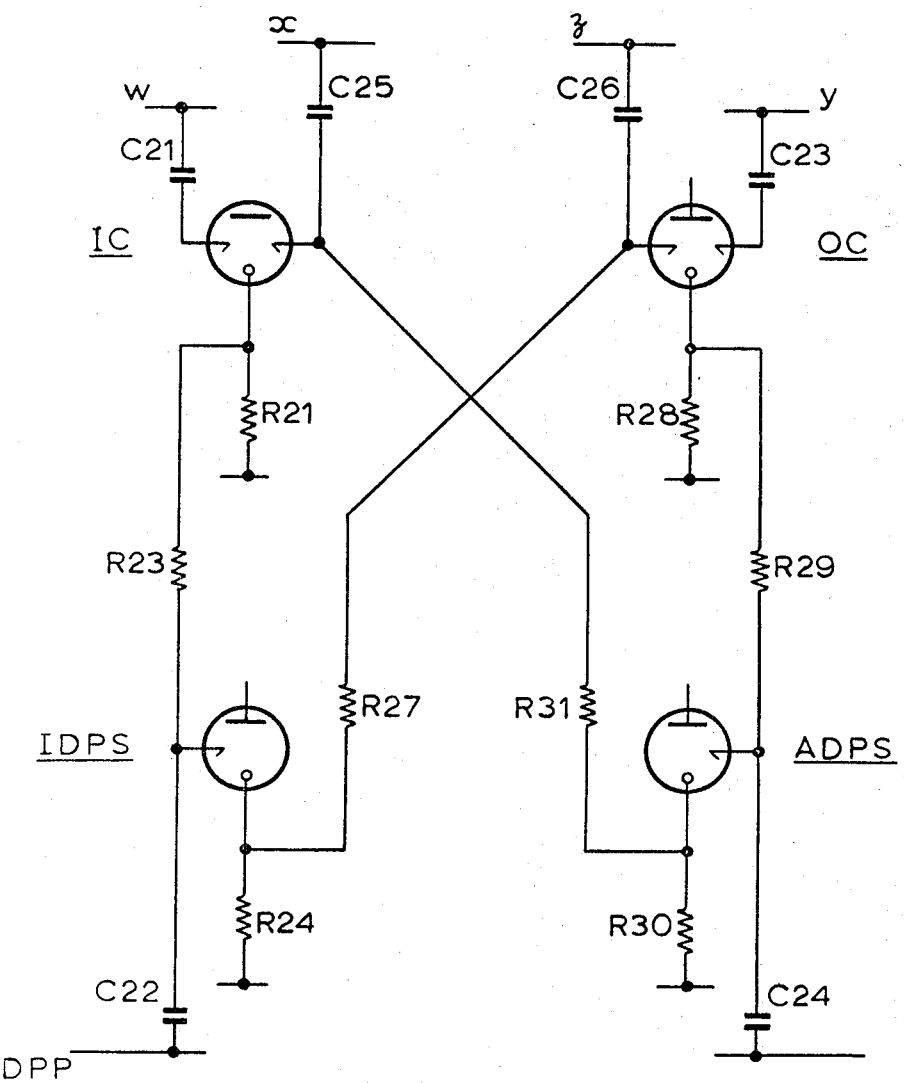
FIG. 4 is a schematic diagram illustrating the relationship between the respective stages of the two controls and the two decimal stores.

The position at which addition is commenced is determined by whichever tube in each of the Decimal Point Stores is ignited. Addition then proceeds either starting with the stage, in each store, immediately preceding the Decimal Point or the stage immediately after the Decimal Point. The manner in which this starting point is ascertained may be more readily understood from referring again to FIGURE 4. In each of the Decimal Point Stores IDPS or ADPS, there will be ignited one of the tubes, this ignited tube marking the position of the Decimal Point in the associated stepping-tube store. Because this Decimal Point tube is ignited it will pre-bias the trigger electrode of one of the tubes in the control: thus for instance if the IDPS tube in FIGURE 4 is ignited the positive voltage at its cathode will apply a positive bias to the trigger of a tube in control OC so that when a pulse is applied, to all the tubes in the chain OC, along pulse line z then the only tube that will ignite is that which is receiving this positive pre-bias from the Decimal Point Store. Thus the tube in the control which ignites upon receipt of this pulse is the tube which controls the stage from which pulses will be read-out, while, similarly, the tube in the other control will mark the starting point and select into which tube in the second store pulses are going to be "read-in."

When multiplying a number in the Input Store and obtaining a product in the Accumulator Store, pressing the first key causes the number already in the Input Store to be transferred, a number of times appropriate to the depressed number key, to the Accumulator Store.

At the end of this multiplication stage the discharge in IC will step one position thus moving the decimal point bias in ADPS one position to the right. If a further number key is now pressed ADPS receives a pulse and hence the decimal point marked in ADPS is shifted one position to the right.

This will occur as further number keys are pressed until the Decimal Point key is pressed, whereupon IC will still step to the right but ADPS pulses will be inhibited; hence the position of the decimal point will be fixed for the rest of the computation.

The sequence of pulses obtained from the pulse pattern generator upon the pressing of a number key is firstly the Decimal Point of the Accumulator Store is shifted one position, secondly pulses are applied along line APL, FIGURE 7, to "read-in" and "read-out" the appropriate number of pulses and thirdly, the Input Control is shifted one position to the right by application of a pulse along line $w$, FIGURE 3.

Although, for simplicity, we have so far considered a machine with only one accumulator store, it will be apparent that the incorporation of a further accumulator store, or further accumulator stores, will greatly improve the usefulness of the machine. Thus, for instance consider a machine having a plurality of accumulator stores and consider the solution of a problem such as $$(a \cdot b) + (c \cdot d)$$

where $a$, $b$, $c$ and $d$ are numbers. One method of performing this calculation is to insert $a$ into the input store and then transfer it to an accumulator store $b$ times to arrive at the product $(a \cdot b)$ in the accumulator store. With the input store clear, a second accumulator store is used similarly to arrive at $(c \cdot d)$ and finally the number from one accumulator store is added to the contents of the other to obtain the final answer.

What we claim is:

1. A computing machine comprising, a source of counting pulses, an input control, an input store connected to said input control, said source of counting pulses thereby storing a first number in said input store, a first decimal point information store associated with said input store for storing decimal point information, an accumulator store having stored therein a second number and having associated therewith a second decimal point information store for storing decimal point information, comparing means connected to said first and second decimal point information store for automatically and continuously comparing the decimal point positions of said first and second numbers, and means responsive to said comparing means for cumulatively conveying information from said input store to said accumulator store in accordance with the positions of the respective decimal points of said first and second numbers.

2. A computing machine comprising an input store for storing a first number with decimal point information, a keyboard for inserting the first number into the input store, an accumulator store for cumulatively receiving information from said input store, means for automatically comparing the decimal point position of the said first number with the decimal point position of a second number already in the accumulator store, means to add the two numbers together with correct reference to the relative decimal point position of each number, a pulse-pattern generator for generating trains of counting pulses, an input control for controlling the application of counting pulses to the input store, an input decimal point store associated with said input control, an accumulator decimal point store associated with the accumulator store, said keyboard being connected to the pulse-pattern generator to select pulse trains from said generator for applying to the input store, an output control responsive to digits of a number held in a store, an ADD key on said keyboard, a plurality of switching means responsive to operation of the ADD key, said plurality comprising a first switching means for disconnecting the input control from the input store and connecting it to the accumulator store to apply decimal point information to the accumulator store, said plurality also comprising second switching means for connecting the output control to the input store to apply decimal point information to the input store, said plurality also comprising third switching means for transferring the number in the input store to the accumulator store, said first and second switching means being operable to align the numbers in the two stores with reference to their respective decimal points.

3. A computing machine comprising a source of counting pulses, an input control, an input store connected to said input control, whereby said source of pulses stores a first number in said input store, a first decimal point information store associated with said input store for storing decimal point information, an accumulator store having stored therein a second number and having associated therewith a second decimal point information store for storing decimal point information, an output control responsive to digits of a number held in store, means initiating an arithmetic operation between said first and second numbers, first switching means responsive to said means initiating for disconnecting said input control from said input store and connecting it to said accumulator store for applying decimal point information to the accumulator store, second switching means responsive to said means initiating for connecting said output control to said input store for applying decimal point information to said input store, and third switching means responsive to said means initiating to connect said input store to said accumulator store for transferring the number stored in said input store to said accumulator store, said first and second switching means being operable to effectively align the numbers in the two stores with regard to the positions of their respective decimal points.

4. A computing machine as claimed in claim 3 wherein each respective decimal stage of the input control and the output control and the two decimal point stores are connected in a common loop, and wherein said first, second and third switching means comprises means for applying bias voltages at points in the loop.

References Cited by the Examiner
UNITED STATES PATENTS

| | | | |
|---|---|---|---|
| 2,575,331 | 11/1951 | Compton et al. | 235—61 |
| 2,913,176 | 11/1959 | Berezin | 235—157 |
| 3,006,548 | 10/1961 | Schulze et al. | 235—160 |
| 3,193,669 | 7/1965 | Voltin | 235—164 |

MALCOLM A. MORRISON, *Primary Examiner.*

K. MILDE, *Assistant Examiners.*